United States Patent
Carrier

(10) Patent No.: US 8,464,816 B2
(45) Date of Patent: Jun. 18, 2013

(54) ALL-TERRAIN HOSTILE ENVIRONMENT VEHICLE

(75) Inventor: Brian E. Carrier, Wyoming, IL (US)

(73) Assignee: CARSAF, LLC, Columbia, SC (US)

( * ) Notice: Subject to any disclaimer, the term of this patent is extended or adjusted under 35 U.S.C. 154(b) by 990 days.

(21) Appl. No.: 12/332,647

(22) Filed: Dec. 11, 2008

(65) Prior Publication Data

US 2012/0185129 A1 Jul. 19, 2012

(51) Int. Cl.
- B62D 61/10 (2006.01)
- B60K 17/356 (2006.01)
- B62D 53/00 (2006.01)
- A62C 27/00 (2006.01)
- B60F 3/00 (2006.01)

(52) U.S. Cl.
CPC .............. *B62D 53/005* (2013.01); *B62D 61/10* (2013.01); *A62C 27/00* (2013.01); *B60F 3/0007* (2013.01)
USPC ..................... 180/24.07; 180/24.08; 180/242; 280/460.1

(58) Field of Classification Search
USPC .......... 180/242, 489, 367, 6.48, 24.07, 24.08; 280/489, 456.1, 460.1
See application file for complete search history.

(56) References Cited

U.S. PATENT DOCUMENTS

| | | | | |
|---|---|---|---|---|
| 2,393,324 A | * | 1/1946 | Joy | ................................ 376/160 |
| 3,149,464 A | * | 9/1964 | Fauchere | ........................ 60/426 |
| 3,161,172 A | * | 12/1964 | Kassbohrer | ................ 440/12.57 |
| 3,351,037 A | * | 11/1967 | Meili | .......................... 440/12.66 |
| 3,414,072 A | * | 12/1968 | Hodges, Jr. et al. | ............ 180/24 |
| 3,659,666 A | * | 5/1972 | Forsyth et al. | ................. 180/6.2 |
| 3,664,451 A | * | 5/1972 | Rogers et al. | ................. 180/374 |
| 4,235,297 A | * | 11/1980 | Porta | ............................ 180/6.48 |
| 4,503,928 A | * | 3/1985 | Mallen-Herrero et al. | ... 180/308 |
| 4,579,073 A | | 4/1986 | Sadler | |
| 5,383,630 A | | 1/1995 | Flatten | |
| 6,029,750 A | | 2/2000 | Carrier | |
| 6,663,114 B2 | * | 12/2003 | Lamela et al. | ............... 280/6.15 |
| 6,739,281 B1 | | 5/2004 | Grimes | |
| 6,798,343 B2 | * | 9/2004 | Carrier et al. | ............ 340/539.13 |
| 6,955,324 B2 | * | 10/2005 | Tanielian | ...................... 244/3.13 |
| 2004/0003929 A1 | * | 1/2004 | Graf | ................... 169/62 |
| 2004/0046688 A1 | * | 3/2004 | Bigge et al. | ..................... 342/52 |
| 2005/0003715 A1 | | 1/2005 | Hewitt | |
| 2005/0126631 A1 | * | 6/2005 | Gorman, Jr. | .................. 137/128 |

(Continued)

FOREIGN PATENT DOCUMENTS

| | | | |
|---|---|---|---|
| JP | 05193515 A | * | 8/1993 |
| WO | WO 9101241 A1 | * | 2/1991 |

OTHER PUBLICATIONS

GlobalSecurity.org, Vehicle-Mounted Active Denial Technology (V-MADS), Internet Archive Jan. 7, 2003, 6 pgs.*

*Primary Examiner* — J. Allen Shriver, II
*Assistant Examiner* — Wesley Potter
(74) *Attorney, Agent, or Firm* — R. William Graham

(57) ABSTRACT

A first chassis and second chassis hingedly connects to the first chassis, wherein each of the first and second chassis includes a plurality of wheels which are operably connected to a hydraulic motor. The hydraulic motor operably connects to an engine which is operably connected to the first chassis. A transmission pump operably interconnects the hydraulic motor and the engine and a flow divider operably interconnects the transmission pump and the hydraulic motor to regulate hydraulic flow to the hydraulic motor.

26 Claims, 7 Drawing Sheets

U.S. PATENT DOCUMENTS

| | | | |
|---|---|---|---|
| 2006/0113136 A1* | 6/2006 | Donaldson et al. | 180/242 |
| 2006/0249316 A1* | 11/2006 | Buller | 180/9.1 |
| 2007/0173987 A1* | 7/2007 | Rowe et al. | 701/2 |
| 2008/0284118 A1* | 11/2008 | Venton-Walters et al. | 280/6.154 |
| 2009/0061702 A1* | 3/2009 | March | 440/12.52 |

* cited by examiner

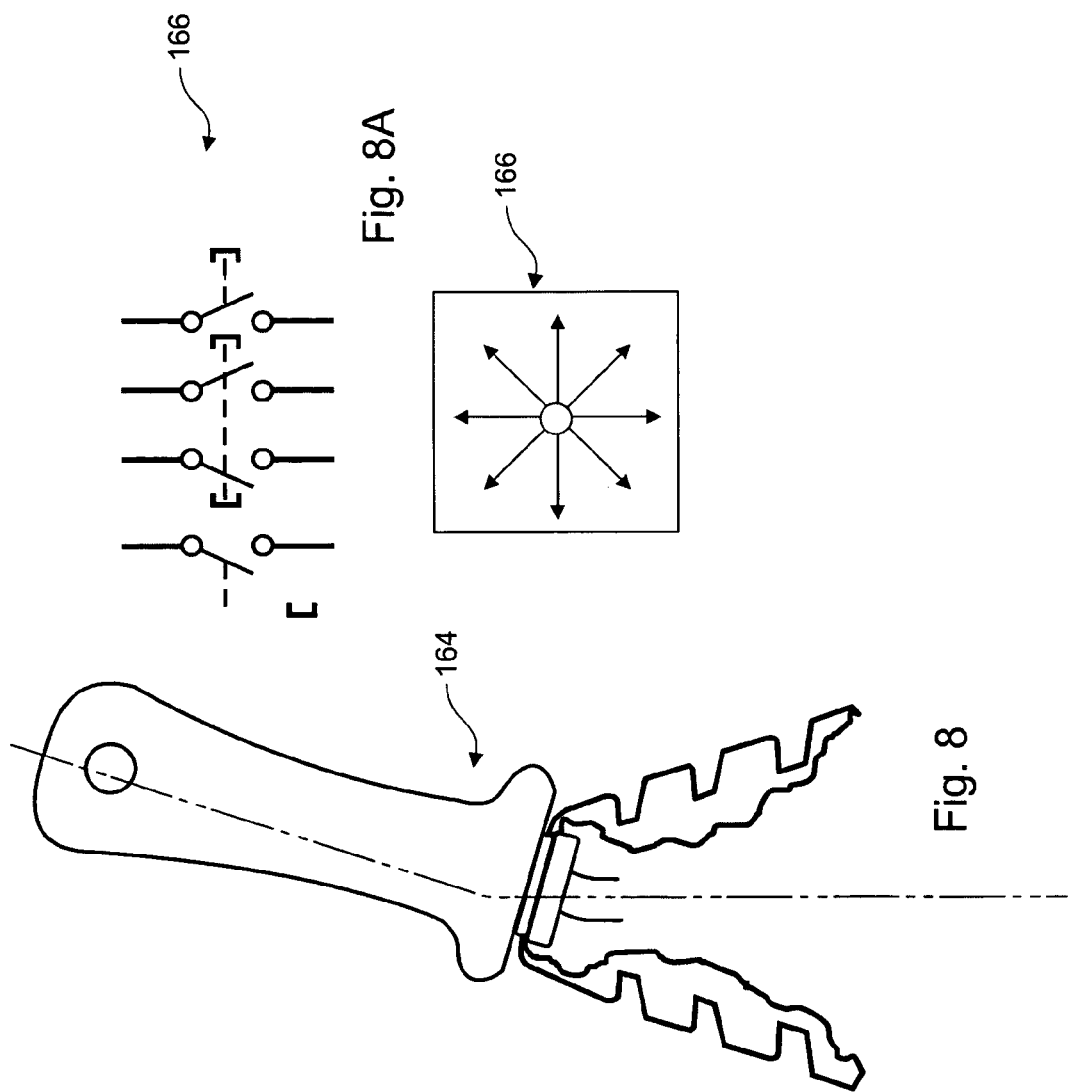

ALL-TERRAIN HOSTILE ENVIRONMENT VEHICLE

This application claims the benefit of earlier filed application U.S. Ser. No. 60/601,451 filed Aug. 13, 2004 and U.S. Ser. No. 11/161,750 filed 2005.

BACKGROUND OF THE INVENTION

1. Field of the Invention

The present invention relates to a multi-purpose all-terrain vehicle. More specifically, the present invention is directed to an all-terrain hostile environment vehicle equipped with various aid units such as quick exchange medical, hazardous material, construction, search, rescue, communications, fire fighting, tracking and weapon units which can be deployed in remote areas or areas not accessible by paved roads.

2. Discussion of Background

Current hostile terrain vehicles of the type used in police, rescue, construction, and military applications have historically included tanks, trucks, Hummers™ and Jeeps™, for example. While these vehicles have been effective, they have not been found very efficient for quick response scenarios in certain hostile environments i.e., (terrain as well as inclement weather particularly when the two are mixed). Further, due to the very nature of the conditions in which the vehicles can be deployed, one or more of the vehicles mechanical or armaments, equipment components can become damaged or disabled during the vehicles use. They are often too large, slow moving, or ill-equipped to handle a variety of potential deployment needs in which now require relatively light weight, fast moving, highly mobile, low profile signature vehicles which can be rapidly deployed via both fixed wing and rotary winged (helicopter), aircraft in airborne parachute delivery, touch and go or sling load deployment operations to also include standard aircraft landing deployments to also as well include sea borne amphibious (swim) to beach and beach landing operations via LST (Light Ship Transport) ship to shore onto land or water and quickly be equipped or reequipped, armed or rearmed, predetermined or re-determined with one or more quick exchange equipment component packages.

In many instances deployment of many military conventional vehicles and equipment and armament systems is not practical or has limited utility. The terrain may be sandy, mountainous, muddy, swampy, jungle, or covered with snow, ice, mines, obstructions, vegetation, trees and in cities the roads may be too narrow to traverse. It is evident that there is a need for a more effective means to transport to and then deploy vehicles, weapons system packages, equipment, construction, logistics, communications, tracking, personnel and wounded and injured over areas of ground having difficult terrains.

There is a need for an all terrain vehicle to be as lightweight with variable alternative power to propel vehicle directional travel and be as mobile as possible, i.e. hydraulic, drive shaft, electric, hydraulic over electric, drive shaft over chain driven gear and or spiral worm gear and using variable fuel sources such as electrical, LP gases, gasoline, diesel, bio chemical and even nuclear fuels etc. There is a need for a solution for a quick directional travel change in the vehicle's steering mobility in the field. There is also a need for improved remote weapons systems. There is a further need for improved vehicle durability for an all-terrain vehicle, during periods of hostile environments such as forest fire or war.

In many instances deployment of conventional aid equipment is not practical or has limited utility. There is a need for a more effective way to transport aid equipment and personnel over areas having difficult terrain and for transporting injured persons. In addition, there is need for a vehicle that can solve all of the above problems.

SUMMARY OF THE INVENTION

It is an object of the invention to provide an improved all-terrain vehicle.

An object is to provide for a multi-independent drive wheel system for an all-terrain vehicle.

Yet another object is to provide a joy stick operated multi-independent drive wheel system for an all-terrain vehicle with counter rotation, skid steering combination turn steering (like an automobile) capabilities. In either stand alone, counter rotation or skid steer, turn steer, or combination of counter rotation, turn steer, skid steer in direct relationship to the position in which the joy stick is in at the moment of forward or reverse or left or right travel as is determined by the vehicle operator (driver). This can also be accomplished autonomously as well.

A further object is to provide a multi-purpose vehicle.

Another object is to provide an all terrain vehicle which is equipped to travel at relatively high speeds and make directional changes in a quick manner.

Another objective is to provide a multi-purpose vehicle for various world climates using multi-method propulsion technologies, which can be battery power stand alone or combination driven drive train as for instance battery power alone would consume large amounts of stored energy in its batteries in a cold environment as opposed to a warm climate.

Another objective is to provide a multi-purpose vehicle for National Security issues such as Sneek and Peek operations and Silent Search and Destroy Missions using various multi-method propulsion technologies and fuel sources for stealth which can be electrical driven or electrical over hydraulic driven drive train for silent running.

Another objective is to provide a multi-purpose vehicle for Military and National Security issues such as Explosive Energy Defeat and Ballistic Armor Capabilities using various composite and or ceramic technologies along with configured angles and ducting into the shape and or design of the vehicle shell or body to facilitate in the need for improved ballistic armor design and capabilities and energy and pressure release associated with IED's and Land Mines.

Another objective is to develop a small lightweight tactical assault vehicle.

Another objective is to develop a small manned or unmanned or manned to unmanned by the methods of using various broadcast signals such as satellite, broadband, high band, Ethernet, Bluetooth and algorithms for robotic ground vehicle's.

Still another object is to provide a vehicle which is equipped for quick exchange of all.

Another objective is to develop a small lightweight tactical assault vehicle.

Another objective is to develop a small manned or unmanned robotic ground vehicle.

Still another object is to provide a vehicle which is equipped for quick exchange of all its functional components and aid units.

Still another objective is to provide not only a light weight vehicle, but also provide a light weight vehicle incorporating an improved fuel efficient propel drive train.

Accordingly, the present invention is an improvement on the prior invention and is directed to an all-terrain vehicle. One embodiment of the vehicle includes a first chassis and second chassis hingedly connected to the first chassis, each of the first and second chassis including a plurality of wheels which are operably connected to a hydraulic motor (or other propelling means, such as electric wheel). In this regard, the connection can be made for up and down movement (vertical) (oscillation) for unlevel terrain movement compensation and or cross hingedly connected for both up and down movement (vertical)(oscillation) as well as side to side movement (horizontal)(oscillation) for unlevel terrain movement compensation. The hydraulic motor is operably connected to an engine which is operably connected to the first chassis and can also be connected to the second chassis.

A transmission pump operably interconnects the hydraulic motors and engine via hydraulic lines and preferably connects to a flow divider and or a combination of flow divider manifolds to regulate hydraulic flow to the wheel motors and other hydraulic components. There can be a plurality of flow dividers and or flow divider manifolds to regulate and distribute flow in the hydraulic lines to each wheel motor on an equalized basis. Isolation valves can be operably interposed between the wheel motors and aforesaid components. These valves could either manually or automatically be sensing pressure changes and isolate a damaged wheel motor from the rest of the hydraulic system preventing loss of power and hydraulic fluid from the rest of the hydraulic system. Additionally, sensors can be provided to detect when there is a pressure differential change in the connections and the system can preferably automatically as well as manually actuate the appropriate isolation valves in a manner to maintain flow equilibration in the system. Thus, if there is a leak in one wheel motor or other hydraulic component, this can be stopped and hydraulic fluid redirected to the remaining wheel motors and other hydraulic components thereby providing drive and PTO (Power Take Off) for the remaining wheel motors and other hydraulic components. The vehicle thus enables a series of backup drive mechanisms. A central control processor can be provided on the vehicle and is operably connected to the sensors and Isolation and speed shift valves and power system, such as that provided by the engine or separate battery, to control operation of each of the aforementioned movable components. Importantly, this provides for counter rotation of wheels where one side of wheels turn in a forward motion while at the exact same time the other side of wheels turn in a reverse motion and vice versa depending on which direction the operator decides to execute the counter rotation e.g. (left or right, in forward or reverse), skid steering where one side of wheels are precluded from moving and the other side wheels are under power of movement turn steer like an automobile where one side receives less power than the other at the wheel motors thereby creating a smooth left or right turn, as well as forward and reverse movement of wheels. Preferably, a joy stick can be operably connected to the control processor and be equipped with contact switches such that actuation of the joy stick in a predetermined quadrant direction or part thereof will initiate one of the aforementioned operations of the control processor thereof will initiate one of the aforementioned operations of the control processor.

In another embodiment of the invention, the vehicle includes more than four wheels, such as six and preferably eight wheels but can contain an even greater number of wheels which are connected to the vehicle and powered by independent hydraulic or other propulsion power such as electric, chain, belt drive, wheel motors. The wheel motors likewise operably connect to an engine on the vehicle via a transmission and or hydraulic pump, which is operably interconnected to the hydraulic or other propel drive means to the wheel motors and engine via hydraulic lines and preferably connects to a flow divider and or combination flow divider manifolds to regulate hydraulic flow to the wheel motors and other hydraulic components. Similarly, there can be a plurality of flow dividers and or combination of flow divider manifolds to regulate and distribute flow in the hydraulic lines to each motor on an equalized basis. Isolation valves can be operably interposed between the wheel motors and aforesaid components. Additionally, sensors can be provided to detect when there is a pressure differential change in the connections and the system can preferably automatically and or manually actuate the appropriate isolation valves in a manner to maintain flow equilibration in the system. Stability can be accomplished when traveling over rough ground and includes a frame having a sealed hull to provide the vehicle with buoyancy. A platform exists on the frame above the hull which includes a plurality of open surfaces through which a quick release connector may be inserted to secure a functional unit or aid unit to the platform.

The hull can be made of a ballistic proof polymer composite material and or combination of ballistic proof polymer and or ceramic materials which includes ballistic proof characteristics. The units can be a self contained: operational fire fighting unit; decontamination unit, communications unit; weapons unit; fuel tank; engine unit; transmission unit; medical aid unit; troop transport unit; tracking unit; logistical supply transport unit; construction unit, etc. To this end, each of these units can be air dropped or sea delivered at a site to immediately engage the enemy, to make ready, replenish or repair a required unit. Other features and their advantages can be apparent to those skilled in emergency or combat equipment from a careful reading of the Detailed Description of Preferred Embodiments accompanied by the following Drawings.

BRIEF DESCRIPTION OF THE DRAWINGS

In the drawings,

FIG. 8 is a diagram depicting joy stick and functionality thereof;

FIG. 8A depicts a switch layout of the joystick with a corresponding directional layout.

DETAILED DESCRIPTION OF PREFERRED EMBODIMENTS

Figure 1:
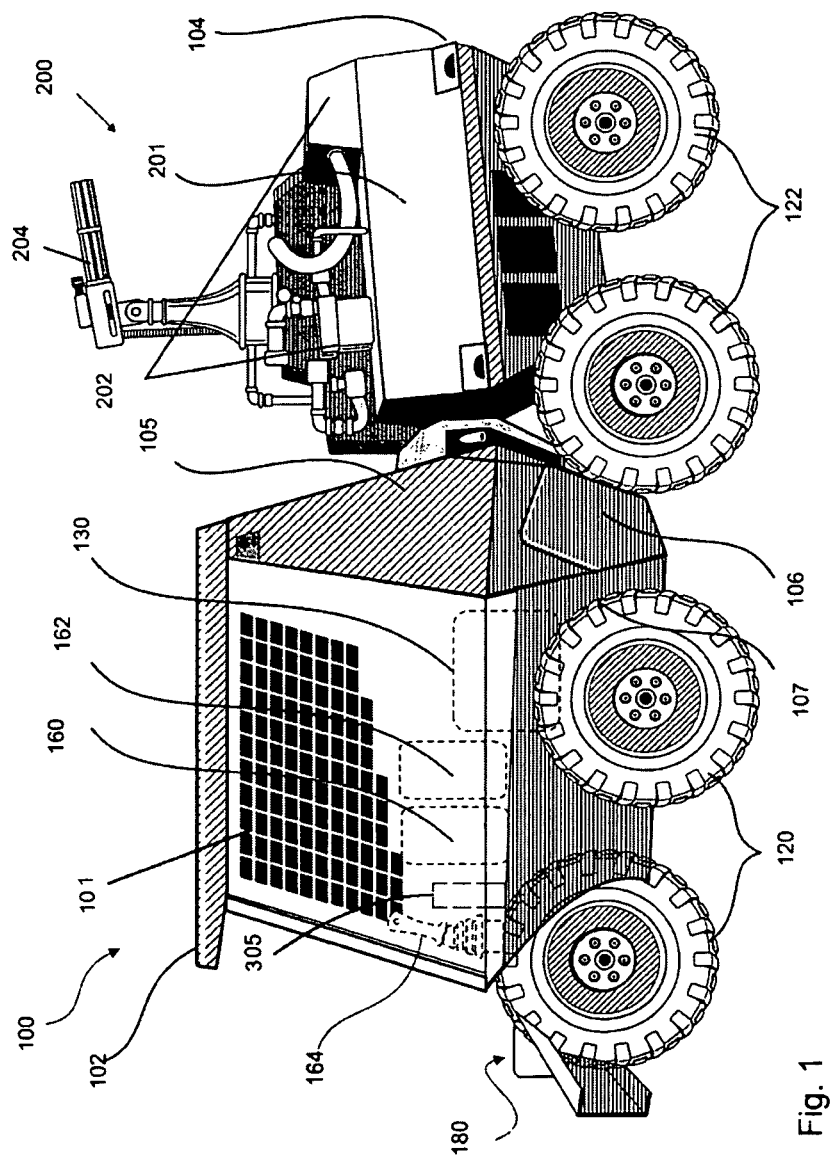
FIG. 1 is a plan view of a vehicle according to a preferred embodiment of the present invention.
Figures 2, 3:
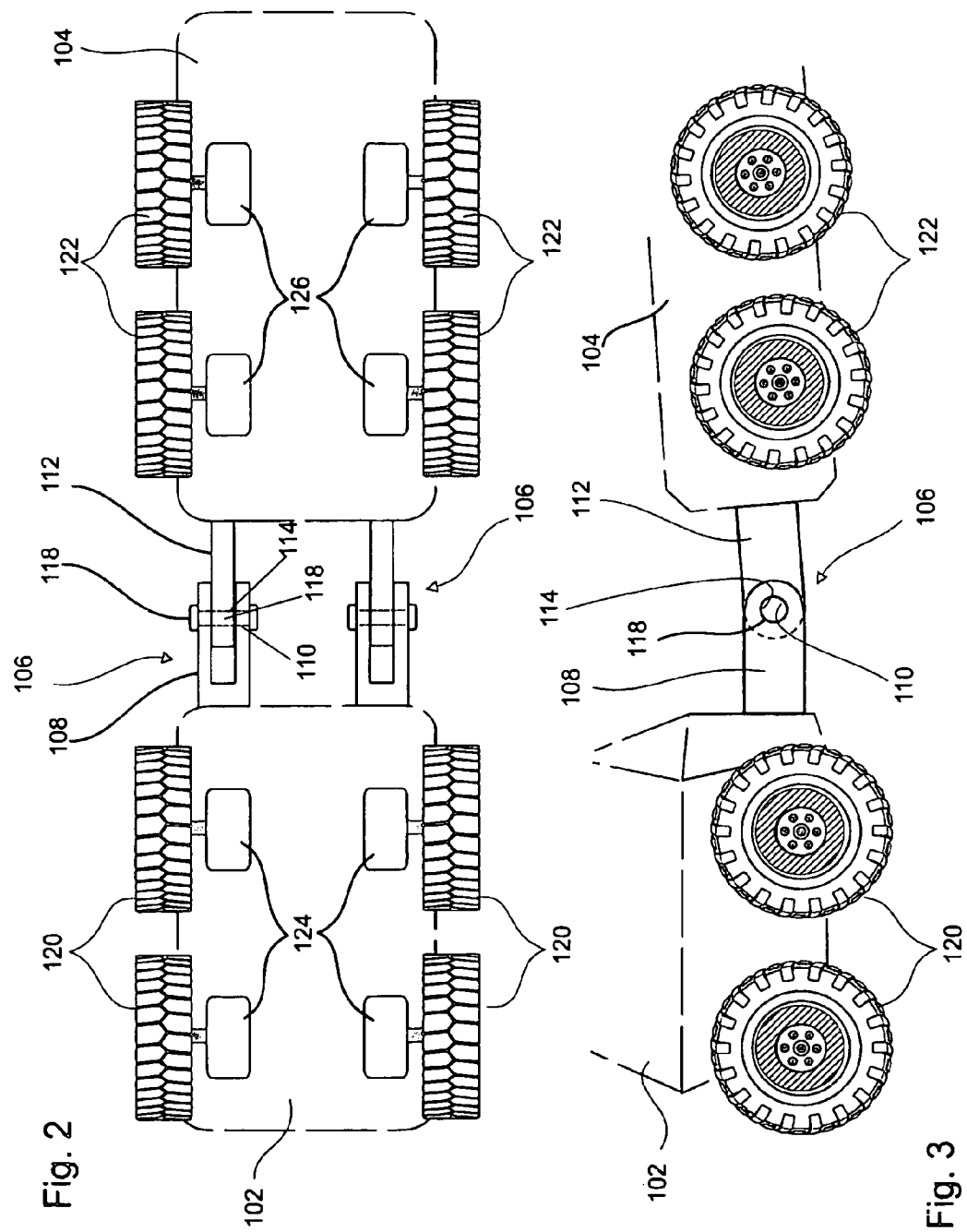
FIG. 2 is a top partial view of a vehicle according to the present invention.
FIG. 3 is a side partial view of a vehicle according to the present invention.
Figure 4:
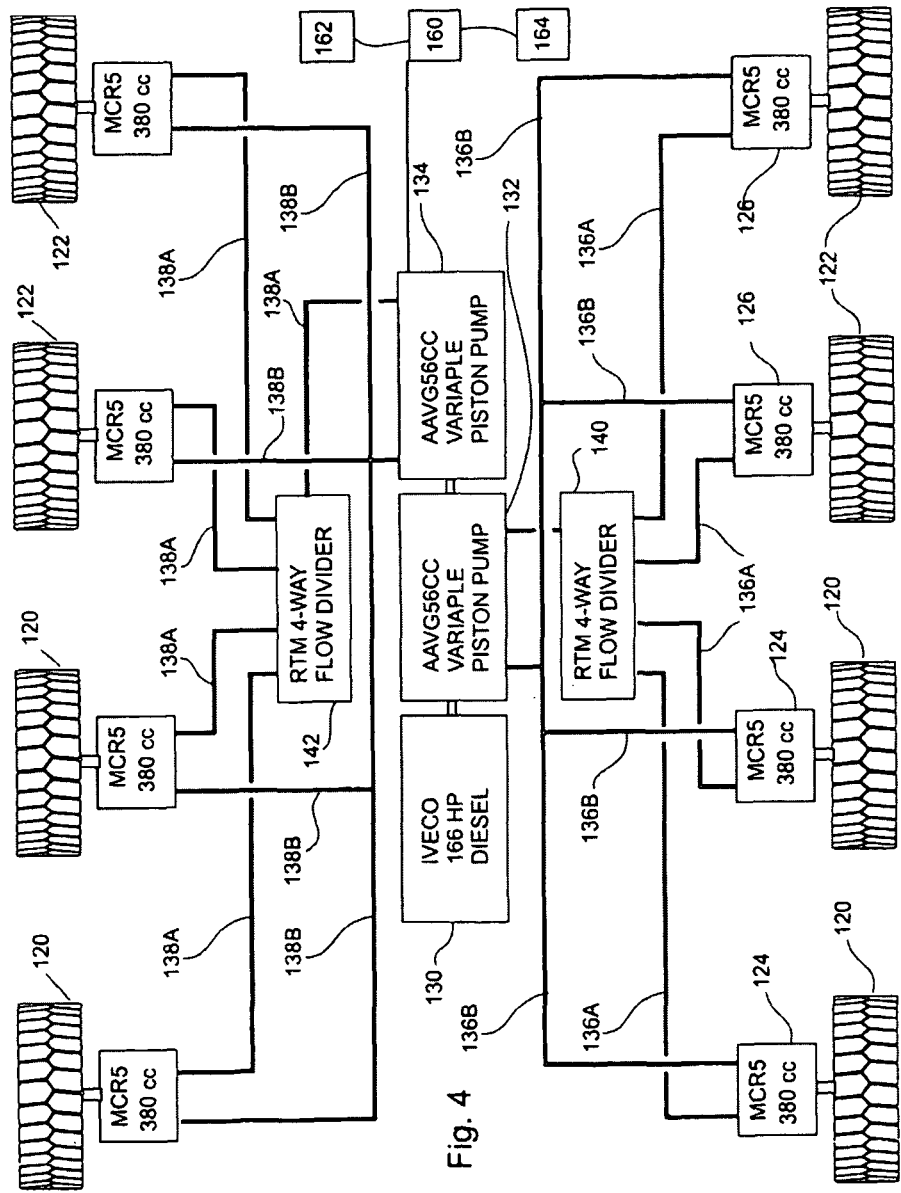
FIG. 4 is a schematic of a flow divider and or combination flow divider manifold drive system of the vehicle of the invention.

Referring now to the figures, an all-terrain vehicle is generally designated by the numeral 100. One embodiment of the vehicle 100 includes a first chassis 102 and second chassis 104 hingedly connected preferably to the first chassis 102 by hinge mechanism 106 which includes a set of side plates 108 extending from a rear the first chassis 102, wherein the side plates 108 each include an opening 110. This embodiment is configured for up and down (vertical) (oscillation) unlevel travel movement compensation and can be modified for cross hinged connection for both up and down (vertical) (oscillation) as well as side to side (horizontal) (oscillation) unlevel travel movement compensation. The second chassis 104 can include a pair of plates 112 extending forwardly therefrom and in a manner to be disposed preferably between the plates 108, wherein the side plates 112 each include an opening 114 which can be coaxially aligned with openings 110. A bearing shaft 118 can be removably disposed through the coaxially aligned openings 110 and 114 such that to form the hinged connection.

The first chassis hingedly connects to the second chassis to permit vertical oscillation therebetween by way of a first set of side plate surfaces of plates 108 on a rear of the first chassis and a second pair of side plate surfaces of plates 112 on a front end of the second chassis wherein openings 110 and 114 are coaxially aligned to receive a bearing shaft 118.

Each of the first and second chassis 102 and 104 include a plurality of wheels 120 and 122, respectively, which can each preferably be operably connected to a hydraulic or other propel means wheel motor 124 and 126, respectively. The hydraulic or other propel means wheel motors 124 and 126 can preferably be of a direct wheel mount type, such as the Bosch Rexroth MCR5-380 which are operably connected a transmission and or hydraulic pump or a combination of pumps which are operably connected to an engine 130 which can preferably be operably connected to the first chassis 102 or optionally second chassis 104. The engine 130 can be a relatively low horsepower diesel unit, such as 166 horse power (124 KW) @3500 RPM FPT (Fiat Power Train) diesel engine.

Transmission and or tandem combination hydraulic pumps 132 and 134 can operably interconnect to the hydraulic (and or other propel means) wheel motors 124 and 126 and engine 130 via hydraulic lines 136A and 136B and 138A and 138B, wherein lines 136A and 138A can preferably connect to flow divider 140 and 142 (and or combination of flow divider manifolds) to regulate hydraulic flow to the wheel motors 124 and 126 and lines 136B and 138B are return lines to the respective pumps 132 and 134.

There can be a plurality of flow dividers and or combination of flow divider manifolds 140 and 142 to regulate and distribute flow in the hydraulic lines 136A and 136B and 138A and 138B, respectively, to motors 124 and 126 on an equalized basis. Operably interposed between the flow dividers 140 and 142, pumps 132 and 134, and motors 124 and 126 are flushing valves 146 for flushing hydraulic fluid to aid in fluid cooling and excess fluid.

Figure 5:
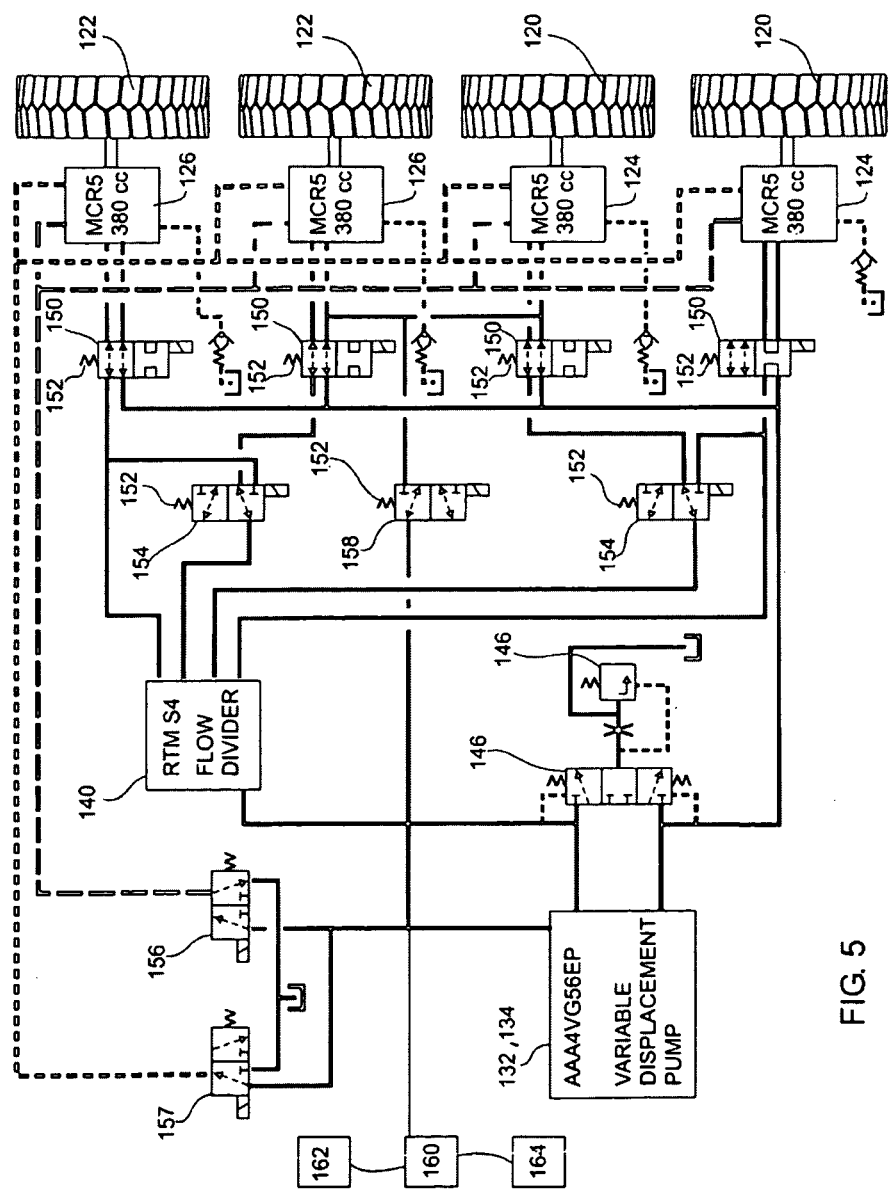
FIG. 5 is a schematic depicting a drive system for operating at low speed.
Figure 6:
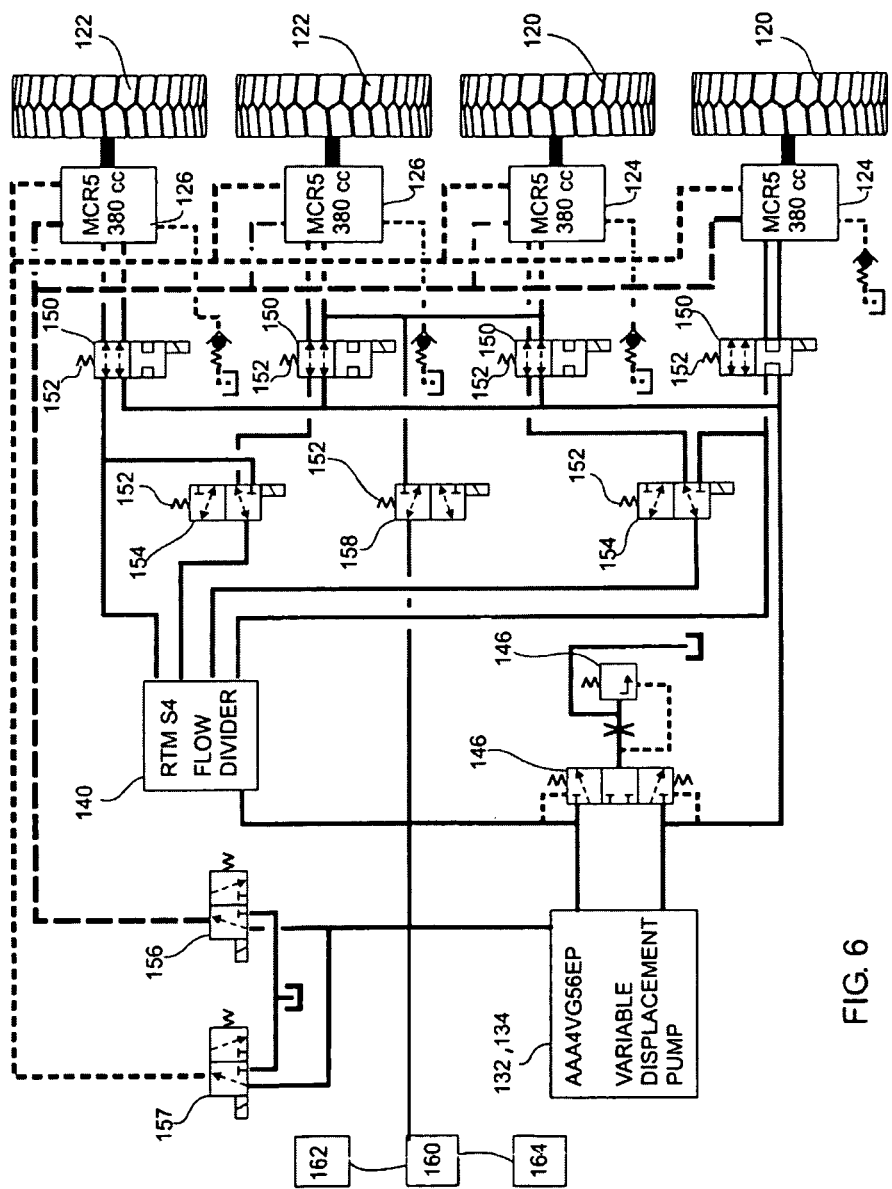
FIG. 6 is a schematic depicting a drive system for operating at mid speed.
Figure 7:
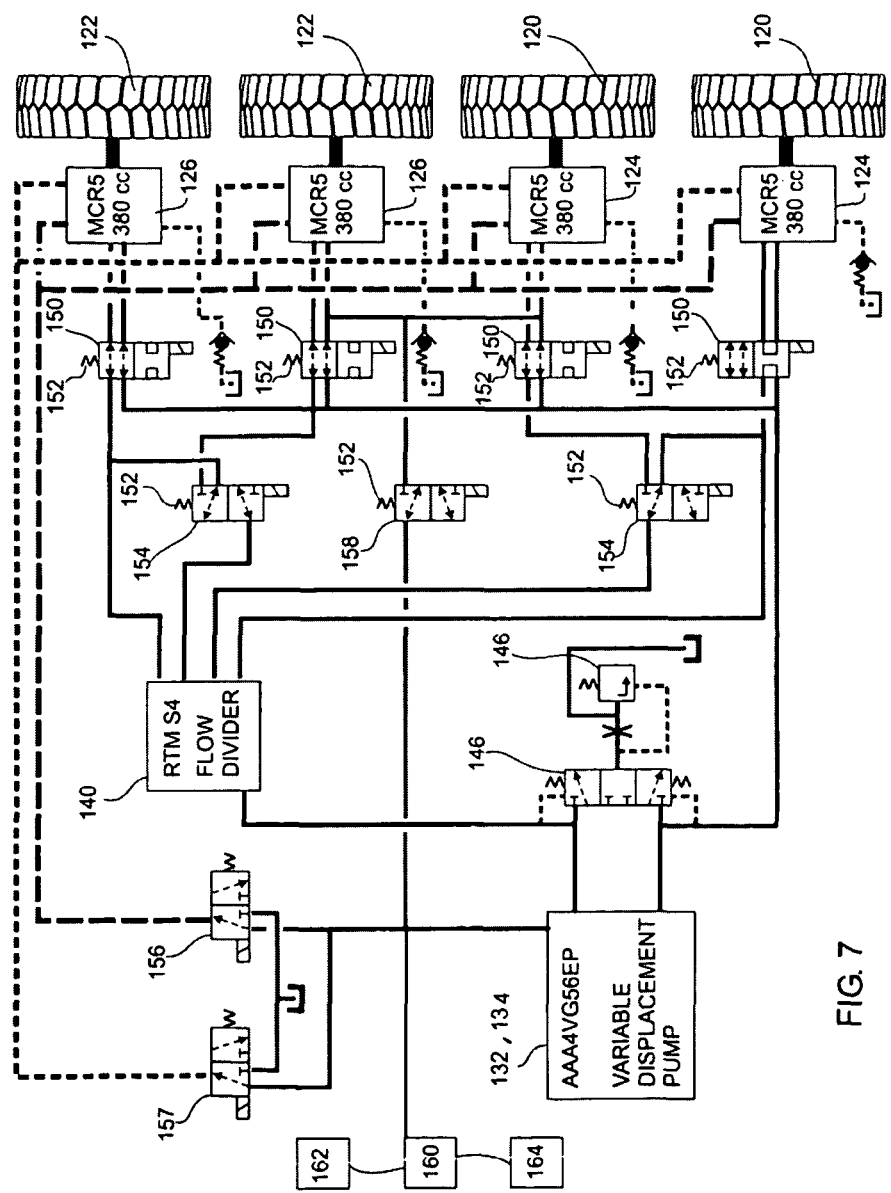
FIG. 7 is a schematic depicting a drive system for operating at high speed.

FIGS. 5-7 depict half of the hydraulic system and thus it is understood that components not mentioned here are likewise operatively disposed in the vehicle 100. Recirculation valves 150 can be operably interposed between the wheel motors 124 and 126 and high speed shift valves 154 operably connect to one flow divider and or combination of flow divider manifolds 140. A second speed valve 156 and brake valve 157 can be operably interposed between pumps 132, 134 and one of each of the wheel motors 124 and 126.

A boost valve 158 is operably interposed between the second speed valve 156 and pumps 132, 134 and recirculation valves 150 and wheel motors 124 and 126. Additionally, sensors 152 can be provided on all valves 146, 150,154, 156, 157, 158 to detect when there is a pressure differential change in the connections and the vehicle 100 can preferably automatically and or manually actuate the appropriate valves 146, 150, 154, 156, 157, 158 in a manner to maintain pressure and or flow equilibration in the hydraulic flow. Thus, if there is a leak in one of the hydraulic lines 136A and 136B and 138A and 138B, this can be stopped by actuating one or more valves 146, 150, 154, 156, 157,158 and hydraulic fluid recirculated to prevent loss of flow to the remaining wheel motors 124 and 126 thereby providing drive for the remaining wheel motors 124 and 126 and wheels 120 and 122. The vehicle 100 thus enables a series of backup drive mechanisms.

A central control processor 160 can be provided on the vehicle 100 and is operably connected to the sensors 152, valves 146, 150, 154, 156, 157, 158, engine 130, pumps 132, 134, flow dividers (and or combination of flow divider) manifolds 140 and 142, battery 162 on the vehicle 100 (i.e., the power system), joy stick 164 to enable control operation of each of the aforementioned components. FIG. 8A depicts a switch 166 of joy stick 164 with an exemplary switch schematic indicating various modes of operation as a function of direction.

Importantly, the ability to control the power system provides for counter rotation of wheels 120 and 122 (e.g. left) rotate and or drive in forward motion while wheels 120 and 122 (e.g., right) rotate and or drive in reverse motion or vice versa, skid steering where one side (e.g. left) of wheels 120 and 122 are precluded from moving and the other side (e.g., right) wheels 120 and 122 are under power of movement, as well as forward and reverse movement of wheels 120 and 122 and turn steer capabilities where as wheels 120 and 122 (e.g., left) rotate or drive forward at full power and wheels 120 and 122 (e.g., right) rotate or drive at a reduced power or vice versa which creates a slow, smooth gradual turning like that of an automobile. Preferably, a joy stick 164 can be operably connected to the control processor 160 and be equipped with contact switches such that actuation of the joy stick in a predetermined quadrant direction or part thereof will initiate one of the aforementioned operations of the control processor. For example, the forward movement of the stick 164 moves the vehicle 100 forward, backward movement moves vehicle 100 back, left or right movement produces a turn steer and or skid steer of one or the other side wheels 120 or 122 to effect a turn based on the position of the joy stick at the moment (e.g. from the point of neutral, half way through the axis of side travel of the joystick the vehicle will be in turn steer mode. As the operator or driver passes the half way axis point the vehicle 100 transitions into the skid steer mode then onto the counter-rotation mode), a diagonal movement produces a turn steer mode of the wheels disposed on opposite sides of the vehicle 100. The vehicle 100 includes more than four wheels, such as six and preferably eight wheels but could be of even a greater number of wheels which are connected to the vehicle and powered by independent hydraulic and or other propel means wheel motors.

The vehicle 100 can be made of polymer composite and or ceramic materials which includes ballistic proof characteristics. Additionally, the vehicle 100 can include one or more self contained operational fire fighting unit; decontamination unit, communications unit; weapons unit; fuel tank; engine unit; transmission unit; medical aid unit; troop transport unit; logistical supply transport unit; construction, etc. To this end, each of these units can be air dropped and or sea borne delivered at a site to immediately engage the enemy, to make ready, replenish or repair a required unit.

The vehicle 100 can be equipped for "quick exchange" of all of vehicle functional mechanical components, weapons armaments and equipment configurations and towing capabilities. Vehicle 100 can be lightweight and stable for traversing over rough terrain and can have a chassis frame system.

The vehicle 100 can be designed keeping in mind heights, widths and length characteristics to match the heights, widths and lengths of various aircraft cargo holding bays to include aircraft width threshold. A cab or crew area 101 can be designed in a user friendly manner so radios and other equipment, such as the joy stick 164 and processor 160 are easily operated within easy reach of the individual. Storage containers can also be designed in such a manner to facilitate easy to reach, store and retrieve battlefield gear (MOLLE gear, Alice packs, CLBVs-combat load bearing vests, BCFG-basic combat field gear, etc.

A protective cage 103 can be provided on the chassis 102 for the occupant and or occupants. Equipment unit 305 including communications, special operations, laser, search, rescue medical, surveillance, cargo, transport, construction, fuel tank, vehicle engine, transmission, propulsion pumps, wiring connectors, wire harnesses, instrument panels, access panels, computer, doors, windows, hatches, sensors, imaging equipment can preferably be operatively connected to the chassis 102 and or chassis 104.

The chassis 104 can include functional engines firefighting equipment 200 including a water tank, 201, dual engine pumps 202 and hoses with nozzles 204 all of which are operatively interconnected. Additionally, foam systems, dry chemical systems, split cell foam tanks, mechanical components, electrified water and or slippery slime tanks, microwave impulse equipment, water cannon, hazardous materials decontamination, weapons armaments, construction aid tools and packages can be provided.

The firefighting equipment 200 preferably includes cross over capabilities to perform hazardous material decontamination operations by merely the flip of an electronic switch and or a manual over-ride to the valve flow system. The fighting equipment 200 can be equipped with quick release pump systems that can provide various pressure and volume outputs to flow sufficient volumes of water and or foam and or dry chemicals in a fire and or hazardous materials decontamination mission from a distance that can not endanger the operator of the vehicle 100 and enable one to quickly change from one flow rate and pressure to another as the mission dictates such as from fire to hazmat to weapons to DEW (Directed Energy Weapons) to crowd control in seconds. The fighting equipment 200 can include pump systems which have the capabilities to quickly change from flow rates and pressures of High Pressure/Low Volume, to Low Pressure/High Volume, to Low Pressure/Low Volume, to High Pressure/High Volume in "joint" work together or independent pump systems and all pump systems can be draft capable, such as gross decontamination of men and equipment to include vehicles, downed aircraft, buildings, civilians, ect; in remote areas of the world during or after a chemical agent and or gas agent (Dirty Bomb), release by an opposing enemy or terrorist cell. Hose and attachment therewith can preferably be equipped to have quick release couplings. The fighting equipment 200 can be self powered (i.e., dual pumps 202) or can be powered by the vehicle engine 130 through stacked hydrostatic PTO (Power Take Off) or hybrid electrical drive systems. Vehicle and secondary engines of the combustion type can be electrically started and all engine horse powers can be predetermined to be capable to give the necessary power to drive the intended function(s) of the engine.

The tank 201 can be used for fire-fighting and includes a sloshless baffle system. The baffle system includes a plurality of panels disposed transversely to one another using both horizontal and vertical plates of various thicknesses depending on the size of the tank (for structural stability) utilizing varying sized holes in each panel (e.g., hole sizes of less than about an inch can be used). The baffle system provides for relatively constant fluid level within the tank 201. The baffle system prevents uncontrolled upward, downward and side to side fluid movement in rough terrains, sudden stops and starts, and most importantly sudden or quick turns that suddenly transfers the fluids weight energy dangerously in different directions. This also provides the vehicle 100 better stabilization and control characteristics at higher speeds during tight or sharp maneuvering as well as on rough, steep or unleveled terrains. The tank 201 is equipped with pump 202 for providing various pressure and volume outputs to shoot sufficient volumes of water and/or foam and or/dry chemicals toward a fire from a distance that can not endanger the operator of vehicle 100. The user/operator can thereby quickly switch from one flow rate and/or pressure to another as needed. Hoses can preferably be provided with tank 201 and are of a quick connect end couplings as is known in the art.

Shock absorbers can be employed on the vehicle 100. Alternatively, it may be preferred to use low pressure tires (15 to 25 psi) that provide both shock absorption as well as a very low ground pressure achieving a 10 to 15 psi ground pressure using only the tires and 5 to 10 psi with the tread/track system employed. This would enable the vehicle 100 to operate with or without a shock absorption system. Shock absorbers can be employed on the vehicle 100 with quick release capability or a pneumatic system employed to control air volume in the wheels 120 and 122 to enable the vehicle to operate with or without shock absorbers. The present invention also contemplates that by removing the need for central tire inflation systems, this would eliminate the confusion the driver or crew faces while in, or after, a combat situation to select from snow/mud, cross country/highway tire control settings.

It is contemplated that a direct drive system can be employed wherein one or more wheels is driven by a drive shaft with suitable yoke connections, a hydrostatic drive transmission or via a hydraulic system as is known in the art. One or more drive systems can be employed on the vehicle 100 providing the user with multiple drive mechanism options.

The multi steering capability enables the vehicle 100 to be placed into a highway mode of steering like that of an automobile on standard paved and unpaved road networks and then changed to skid steer type steering or counter rotation steering for greater steering mobility when needed as in combat escape and evade or weapons set up and deploy maneuvers, rough terrain or congested areas such as city streets enabling all vehicles to turn within the length of its own radius.

The aforesaid components making up the drive system can be controlled by a processor 160 which can respond from the joy stick 164 input. The drive system can be programmed to be fully automatic through all speeds or manually controlled. The drive system can also have programmable down-shift inhibit points programmed into the processor 160 which would prevent the drive system from reacting to a shift or directional signal if the action would result in an engine over-speed and/or damage situation or to prevent accidental directional shuttle shifting at speeds which would cause a drive line package damage, premature counter rotation, skid steer movement or operator's discomfort, i.e., neck and back injuries, (whip lash).

The vehicle's processor 160 can be reprogrammed to fit the vehicle 100 particular mission needs as it is determined or redetermined and employ on board diagnostics system which can be monitored remotely. This can be accomplished through radio frequencies, cell, digital, satellite, infrared signals from aircraft such the U.S. Air Force Predator and other aerial drone aircraft.

The vehicle 100 is designed to be drivable on uneven ground, on mud, through deep water, or on other surfaces a regular automobile or truck cannot be driven on. To achieve this effect, the vehicle can be relatively lightweight, having eight, ten or twelve-wheel drive or more, which can preferably be sealed against water intrusion to critical engine and transmission parts. Weight reduction can be achieved by using various polymers which also have ballistic proof capability.

This combination also has several important advantages, such as the ability to transport a pump or other device to direct the water, foam and dry chemicals at the fire, as well as decontamination solutions for decon missions. For example, the pump can force the water, foam and dry chemical and decon solutions through the hose at a higher velocity, thus allowing the firefighters to attack the fire or decon objective from a greater distance than if they were on foot. Furthermore, while it is not practical for a firefighter or group of firefighters to carry a water cannon and then hold and operate it by hand, the present invention does permit the transportation of the water cannon, thus enabling the firefighters to attack the fire or decon objective from an even greater distance. The water cannon is as well capable to shoot streams of water (straight streams, fog, wide streams) of just water, foam, dry chemical or decon solutions in any combination and can be remotely controlled either wirelessly or wired in manned, unmanned and autonomous modes as well the water cannon can be operated manually in the case of a system failure.

Another important feature of the present invention is that the tank, hoses, and pump may be readily removed from the vehicle through the use of quick-release devices. Assuming the water and foam tanks are empty, four firefighters should easily be able to remove the fire-fighting equipment, which would enable the vehicle to be used during a search and rescue. A remote controlled crane can be mounted on the rear of chassis 102 can also be used to facilitate in the removal of any of the aforementioned package components. The back portion, or rear deck, of the vehicle is capable of carrying two injured persons while two emergency personnel ride in the vehicle's passenger area. Consequently, transforming the vehicle and enabling it to be used for a different purpose reduces the number of vehicles required and provides greater flexibility to the firefighters, military personnel or other emergency personnel who use the device.

The use of a pump mounted to the all terrain vehicle which is capable of pumping water from a lake or stream onto a fire is another feature of the present invention. This feature reduces the need to transport water to the site of the fire or, in the alternative, makes it easier to transport water pumping equipment to the body of water to be used infighting the fire.

It can be apparent to those skilled in the art of fighting fires in remote areas that many modifications and substitutions can be made to the preferred embodiments described above without departing from the spirit and scope of the present invention. For example, vehicle 100 may also be provided with a winch 180 or other equipment that can aid the vehicle in its fire-fighting mission or during a search and rescue.

The tank 201 can preferably have a recessed top for storage of hoses, multiple 100-foot hoses, and a large fill orifice, a screen to filter debris that would otherwise clog hoses, pump 202 to refill the tank 201 from lakes, ponds, or streams. Additionally, the tank 201 includes a master drain for flushing and cleaning the tank. In addition, a water cannon may be provided with vehicle 100 and located adjacent the operator to enable use thereof.

Manual controls provide for operation of the vehicle 100. However, the operations of each unit described herein can be performed by remote control as part of processor 160 which is operably quick connectable to the vehicle 100 having suitable connections therewith for each aforesaid component as well as transceiver equipment associated therewith enabling the processor 160 to be reprogrammed on a need to need basis. This enables the vehicle 100 to be remotely controlled via line of sight, gps, or by air via aircraft such as the so-called "Preditor." Remote control mechanics, servos, hardware, wiring harnesses can be quick releasable to facilitate easy replacement of any faulty components in case of damage or failure. A manual over-ride can be incorporated should the vehicle 100 need to be taken out of autonomous, unmanned mode for whatever reason and vice versa.

For example, in an instance where as the operator could become incapacitated on a mission, the vehicle 100 via radio, satellite, cell, Modbus, serial communications, remote serial communication ports, digital or IR (infrared) signals can be placed into remote control operation to continue the mission as well as performance and other informational data can be transmitted and received by a second or more party remote from the vehicle 100. This can be accomplished through methods such as using the SAE (Society of Automotive Engineer's), J-1939 standard reader's protocol using the engine and transmission ECM (Engine Control Module) and ECU (Engine Control Unit) and transmission data reader's through the use of pressure regulators linked with On Board Diagnostics (OBD-2) 16 or more pin connector linked to various communication signals such as "Blue Tooth", communication transmissions to send all relevant and pertinent engine, transmission, weapons system data to and from the aircraft allowing the aircraft and the vehicle 100 to communicate with each other through vehicle 100's on-board computer software to convert any incoming wide spectrum of broadband signals, radio frequencies (UHF, VHF, Low Band, High Band, etc.) cell, satellite, digital or IR (Infra Red) signals into electrical impulses to engage servo's attached to vehicle 100 steering, braking, engine, transmission, weapons deployment and engagement systems, etc., allowing the aircraft to be the forward observers eye's (FO), for guidance to the vehicle 100. For instance, the aircraft informing the vehicle 100 that it's approaching a ravine and informing the vehicle 100 that it needs to down shift the transmission into a lower gear ratio for more power to negotiate itself at a slower speed to drive into the ravine and having the power to climb back out of the ravine. All pertinent data transmissions can be sent back and forth allowing for all systems monitoring such as vehicle speed, rpm, water temperature, oil pressure, gear transmission, electrical input and output, weapons diagnostics to include arming and disarming as well as including weapons selection if equipped with multiple weapons systems, water tank level, foam tank level, pump water pressure etc.

Switch functions within the vehicle 100 can be enabled to perform multiple use, dual functional e.g.; headlight switch will control the functions of the headlights but can also become the firing switch for the weapons systems and the windshield wiper switch controlling the wind shield wipers but also being capable of becoming the deployment activation switch for the missile launcher or grenade launcher deployment. All switches and switch functions can be reprogrammed or turned off rendering them non-usable to include the engine and transmission in the event the vehicle 100 is commandeered by the enemy using radio, cell, satellite, digital, IR signals etc. via aircraft.

Sensors including Multi-function RF, UAV, Tri-Band Radar, Active Protection Radar, unattended sensors network Sensor Technologies in (Ku, Ka, W-Band, etc.), can be employed into the vehicle 100 using a single electronically scanned antenna (ESA), that are high performance, electric field tunable and temperature insensitive that can be shared between all of the vehicles sensors. Doing so can help to cut costs, lower power consumption and reduce the over-all weight of all of the vehicle 100.

As the trend continues from heavy forces to a much lighter, faster and mobile force this inevitably places more constraints on current sensor systems for engagement lethality and survivability issues. It is contemplated that the vehicle 100 can include improved thermal sensors integrated with cool thermal systems incorporating wide fields of view and narrow fields of view giving the ability to scan more of the field to then zoom and detect various targets. The vehicle can meet the challenge by integrating N-MEMS networked sensor systems and integrated sensor functions and technologies with an end result of better surveillance; active protection, command guidance, field combat recognition, active/passive target acquisition, combat identification, weapons guidance, secure point to point communications, networks for situational awareness and signal intercept sensors that are reduced in size to fit into reduced space that can become integral to help to ensure the survivability of the future lightweight operator within smaller lighter weight vehicles.

Another benefit over traditional mechanically scanned antennas can be the added ability to reposition the antennas beam instantly to any given position within the coverage area of the sensors without having to manually or physically move the antenna. Additionally, technologies such as phased array and true-time-delay technologies, using ferroelectric tunable phase shifters, tunable filters for digital receivers, tunable impedance transformers to reduce loss due to impedance mismatch, MEMS phase shifters, millimeter wave integrated circuits (MMICs), and optical control of microwaves in a phased array antenna can be employed. The Rotman lens beam forming technologies for true-time-delay, multiple simultaneous beams can be generated to cover a broad band of the RF spectrum for multifunction RF sensing. By applying multi-function radio frequency electronically scanned antenna sensors, real beam radar, direct digital synthesizer and field programmable gate array processing technologies designed for the architecture of vehicle 100. Algorithms of the sensors can be integrated into the vehicles package, wherein a multi-functional sensor system with two-dimensional electronically scanned antennas, integrated receiver/exciters, flexible waveform synthesizers, high throughput signal processors can compliment the architectural design of all vehicle 100. This reduces the number of antennas and interfaces on the vehicle 100 and can enhance the operability and infuse the inclusion of a multi-functional operating platform that is compact to fit within the scope of the vehicle package.

EO/IR image processing, algorithm technologies can also be incorporated into the vehicle 100 to maximize detection, clutter rejection and identification capabilities of various sensors and missile detection systems. In finding, detecting, engaging and then eliminating threat targets in a battlefield situation, one can encounter situations of partial occlusion to total obscurity. By receiving additional information in the form of multiple views of a potential target through a moveable or moving sensor platform, compiled with reconnaissance data available along with information from additional sensors provide multiple views of the target. Sensors include broadband and multi-spectral passive infrared sensors, imaging laser sensors and hyper-spectral imaging sensors with spatial clutter rejection technologies, and "Acoustic Battle Field" sensors, can also be incorporated into the vehicles design signature. Acoustic sensors built into the vehicle 100 are passive by their nature and can provide real time, non line of site tracking and identification of enemy battlefield targets. Infrasonic sensors provide long range detection and target locating, electronic warfare (EW), countermeasures (ECM), and long range radio transmitters (e.g. base station to satellite), platform (combination or stand alone) systems can also be incorporated into the vehicles host of sensors and electronics. Beam-forming, target classification, identification algorithms, target tracking (using lines of bearing), signature molding and battlefield information validation can be incorporated into the vehicle 100. By incorporating these imaging processing systems and acoustical battlefield sensor technologies into the vehicle platform, the vehicle 100 includes information systems which can be able to track helicopters, locate small arms (individual or sniper), and large (artillery), caliber gun and missile signatures, and track and identify other ground vehicles and importantly the vehicle operator and data analysts, preventing combat fatigue and information overload. The invention significantly reduces decision making in a combat situation by providing a myriad of capabilities herein described and can sharpen the operator's situational awareness, confidence and morale where needed in performing one's job.

Ultra-Wideband Foliage and Ground Penetrating Radar technologies can also be incorporated into the vehicle 100. Low frequency imaging radar technologies, "UltraWideband" (UWB), "Synthetic Aperture Radar," (SAR), and electromagnetic modeling and Short-Pulse Ground Penetrating Radar technologies can be provided in the vehicle 100 and can provide the ability to reliably detect a stationary vehicle hidden under foliage as well as subsurface targets such as buried mines and even unexploded ordnance. Other benefits to employing this technology can be detecting negative obstacles (ditches, ravines, cliffs, ponds, lakes, streams, etc.), as well as positive obstacles (rocks, trees, buildings, vehicles, bridges, etc). This enhances the vehicle 100 in the autonomous, unmanned robotic mode. Another critical initiative that can be achieved by employing these technologies into the vehicles system package is to counter-mine, humanitarian demining, and unexploded ordnance (environmental remediation), operations that confront present systems today.

Further, software programs can be included into computer processor 160 of the vehicle 100 can include Cobra Command Post Computer Package consisting of Bio-Watch, Guardian Qualitative Assessment Tool (G-QAT), Decision Support System (DSS), Embedded Resources, Guides for Response to include Forensic, Emergency Response, Jane's Chem-Bio, NDPO on Scene Commander's, USAMRIID Medical Management of Biological Casualties, USAMRIID Medical Management of Chemical Causalities, AFRRI Medical Management of Radiological Casualties, MSDS Material Safety Data Sheets, BDR Bomb Dictionary Reader, RIDS Response Information Data Sheets, AIT Agent ID Tool, NFPA 704 Placard Tool, PPE Personal Protective Equipment, Glossary Tool, TSWG Terrorist Bomb Threat Evacuation Distance Tool, TSWG Damage and Injury Distance Card Tool, START Simple Triage And Rapid Treatment Tool, Form Completion Tool, SOP Standard Operating Procedures Tools, Checklist Tools, Incident Reporting Tools and IED tools. The CoBRA Command Package is compatible with electronic mail, wireless communications, local area network (wired or wireless), Internet file transfer and manual file transfer using a disk or other media. The CoBRA Incident Report can carry with it attachments, including digital imagery, standard report forms, or other digital documents. This greatly facilitates data transfer on-scene and provides a definitive record of activities during or after an incident. In addition CoBRA uses the XML open data standard for creating incident reports, allowing CoBRA incident reports to be digested by third party data base and records management systems. Since the checklists and guidelines in CoBRA support a variety of different types of emergency response, the use of CoBRA at all levels of an Incident Command System greatly facilitates the situational awareness of unit commanders, overall incident commanders, and any subsequent follow-up investigations, or other software programs known in the art can as well be incorporated into vehicle 100.

One computer system in the vehicle 100 is of the type that can be quickly released and be removable so that in the event a solder or other operator has to abandon the vehicle 100 in an event such as the vehicle becomes incapacitated or inoperable due to attack or equipment failure the vehicle 100 operator and crew can perform an escape and evade taking all collected information and data with them as well as still having a working GPS system in the computer to assist in escape and evade as well as extraction and search and recover missions.

Each of the structural components can preferably be made of ballistic proof material, steel or other suitable material to enable the multiple functions of land and water use to be carried out. Each of the units described is exemplary for use with the invention and not intended to so limit the invention, rather modifications of these units are intended to be covered hereby.

The composite and or ceramic armor ballistic resistant materials used in making the various components interior/exterior of the vehicle 100 integrate advanced polymer-matrix, ceramic-matrix and metal-matrix composite materials which are preferably lightweight, quick exchange mission tailored having very high strength and brittle fibers which are combined with chemically resistant resins capable of being drawn out into thin layers and used as a building block to form an end result bulk material having a strength and stiffness nearing that of the fibers with the chemical resistance properties of the polymer.

Composite and ceramic materials can be used for both mobility and survivability as well as to achieve energy-absorbing armor equivalent to that of steel for ballistic protection while achieving a weight reduction factor of less than one-third the weight of steel. The composite materials that include two or more physically distinct and mechanically separable materials mixed in such a fashion that the dispersion of one material into the other material achieves the optimum physical characteristic properties desired for this project. A characteristic property of the constituent material is that of high-stiffness and high-strength reinforcing material that usually consists of a stand alone (a single/particular fiber type), fiber or multiple fiber types such as graphite, glass, Kevlar™, carbon, Aramid™, to include Nano Composite Technologies (also known within the art), of various woven and inter-woven flat or tubular fibers or particles (cut, chopped at various lengths, ground to various consistencies of sizes of particles as well as braided or roped type designs can be used. The use of reinforcing materials either polymeric, such as polyethylene, polypropylene, such as Nylon 6 or Nylon 66 or ceramic or thermo-plastics and Long Fiber thermo-plastics that achieve very high strengths and stiffness at low densities. Another constituent material to be used can be a continuous "matrix" type i.e., (ceramic, polymer, metallic, thermo-plastics or Long Fiber thermo-plastics), materials that can surround and envelope the reinforcing material to permeate the open space between the fibers or particles being used. Heat and/or pressure-based processing of the composite material matrix along with the reinforcing materials, using a variety of different techniques can result in the composite material matrix creating a composite ballistic resistant armor capable of defeating a wider range of small arms calibers and directed energy threats at a higher mass level of efficiency. For instance, a woven and or interwoven design layer of flat fibers in a front configuration layer, followed by woven and or interwoven braided or rope type design fibers configured in a secondary layer, followed by another layer of woven and or interwoven flat fibers design configured in a third layer, (followed by more consecutive layers if needed), impermeate with a host of different resin types (also known within the art), being encased within a variety of thermo-plastic and Long Fiber thermo-plastics polymers, (that are also known within the art).

This provides reduced weights, lower profile signatures, reduced overall composite thicknesses, ending with lower composite armor manufacturing costs. Other armoring techniques can be incorporated along with the composite material matrix; for example, using both positive and reversed polarity electromagnetics along with liquid chemicals that destroy the physical properties of various munitions as an example, copper or lead bullets embedded into the composite materials matrix, electrified plating and electrified encapsulated ceramics to destroy the threat of explosive warheads, chemical energy warheads, shaped charge/tandem shaped charged/precision shaped charged warheads, explosively formed penetrators and the impact of high velocity kinetic energy penetrators. Further materials which can be employed include Non-Explosive Reactive Armor (NxRA), and Non-Energetic Reactive Armor (NERA), capable of possessing a good multi-hit ratio against shaped charged warheads, (NREA when used with other armors) as well as both armors are considered to be passive armor technologies that are inexpensive and relatively easy to integrate. NxRA uses gas generating or other non-explosive materials to create an energetic drive material with-in the armor; and Momentum Transfer Armor (MTA), technologies used in small compact modular configurations that use explosively launched small bars to collide into the side of kinetic-energy penetrators and destroy them through fracturing, deflection and rotation. MTA along with composite matrix materials could reduce volume and weight of an explosive charge needed to destroy a wide range of enemy munitions; Smart Armor (SA) is also another reactive armor technology that can be integrated with composite material matrix using sensors in conjunction with microprocessors in the armor as a threat defeat characteristic reducing the size, weight and space needed to employ the armor. The sensors would determine the location of the munitions impact, velocity, and diameter while the microprocessor calculates the time when the armor should be deployed. Explosive Reactive Armor (ERA), and Self Limiting Explosive Reactive Armor (SLERA), technologies could as well be possibly incorporated with the composite armor matrix materials. ERA is the single most effectively proven technology for destroying explosive and kinetic-energy anti-armor munitions.

Both ERA and SLERA armor technologies produce good multi-hit capabilities with-in modular configurations and both are inexpensive and easy to fabricate. Advanced ERA designs are considered to be advanced technologies providing protection against many anti-armor munitions. SLERA uses an explosive charge in an arrangement that limits the production of power generated from the initial blast of the charge to a controlled space. This produces a reduced performance when compared to the characteristics to ERA armoring technologies, however the reduced blast reaction does contribute to a reduced shock on the vehicles structure as well as the SLERA modules themselves. SLERA can be a passive armoring material with explosive charges designed with increased safety in mind, i.e., the vehicles reaction with-in itself as well as behavioral reactions with other advanced technologies to include the vehicles electronics systems and threat distinction systems.

The hull (bottom section) of the vehicle 100 can preferably be shaped in such a configuration as that of a boat in a slight curved V shape with angles from 1 degree to 95 degrees and may be greater that accomplish two separate tasks. (Task1) The hull of vehicle 100 can facilitate amphibious operations that accomplish three different sub tasks being (1) eliminating water drag on the vehicle as it moves through the water, (2) water build up distribution in front of and to the sides of the vehicle 100 (which slows the movement and turning capabilities of the vehicle 100), (3) significantly enhances both the movement directional speed i.e. forward or reverse and significantly enhances the turning capabilities left or right as well of vehicle 100. (Task 2) Upper body 105 and lower body 107 of vehicle 100 can facilitate land and sea borne operations in relationship to ballistic resistant properties and Explosive Energy Dispersion, (EED), in relationship to IED's (Improvised Explosive Devices) and other explosive devices i.e. (land mines and or water mines), that accomplish two sub tasks. (Sub-Task 1) The hull uses angles of 1 degree to 95 degrees or greater significantly enhance ballistic projectile defeat by creating a ricochet effect thereby increasing the effectiveness of the used method of armor. Using varying degrees of angles in different configurations using different thicknesses within the armors configuration can create a pocket and or channel the trajectory path of the munition into this pocket to catch or trap the munition or channel and deflect the munition into a different trajectory away from a crucial portion of the vehicle 100. (Sub-Task 2) The hull can use the same 1 degree to 95 degree angles or greater incorporated into configuration geometry into both the upper and lower body of vehicle 100 which accomplishes explosive blast energy dispersion away from the vehicle 100. The lower body of vehicle 100 would also incorporate blast ducts using 1 degree to 95 degree angles in a shape configuration of duct channels formed within or incorporated onto the lower body of vehicle 100 that would give the energy and or pressure release of the blast a directional path to follow leading away from the vehicle 100 and critical components of the underbody and side components of the vehicle 100 such as wheel mounting hubs, tires and other critical components.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. An all-terrain vehicle, which includes:
   a first chassis and a second chassis hingedly connected to said first chassis to permit vertical oscillation by way of a first set of side plate surfaces on a rear of said first chassis having an opening therein and a second pair of side plate surfaces on a front end of said second chassis having an opening therein, and wherein said openings are coaxially aligned to receive a bearing shaft therein and hingedly connect said chassis, each of said first and second chassis including a plurality of wheels which are each operably connected to a respective hydraulic motor;
   said hydraulic motors operably connected to an engine which is operably connected to said first chassis;
   a transmission pump operably interconnects said hydraulic motors and said engine;
   a flow divider operably interconnects said transmission pump and said hydraulic motor to regulate hydraulic flow, wherein said hydraulic motor, said flow divider, said transmission pump, and said engine are operably interconnected and hydraulic lines interconnect said hydraulic motor and said flow divider and a central control processor is operably connected to said flow divider to regulate and distribute flow in said hydraulic lines to each said wheel on an equalized basis.

2. The all-terrain vehicle of claim 1, which is further characterized to include valves connected to said hydraulic lines and operably interposed between said hydraulic motors and said transmission pump.

3. The ail-terrain vehicle of claim 2, which is further characterized to include means connected to said hydraulic lines to detect a pressure differential change in said hydraulic lines and actuate said valves in a manner to maintain pressure equilibration in the hydraulic lines.

4. The all-terrain vehicle of claim 1, wherein the central control processor is operably connected to and controls valves.

5. The all-terrain vehicle of claim 4, which is further characterized to include means connected to said hydraulic lines to detect a pressure differential change in said hydraulic lines and actuate said valves in a manner to maintain pressure equilibration in the hydraulic lines.

6. The all-terrain vehicle of claim 5, wherein the central control processor is operably connected to at least one of said detection means, said valves, said hydraulic motors, said engine, said transmission pump and said flow divider to control operation thereof.

7. The all-terrain vehicle of claim 6, which includes a joy stick operably connected to said central control processor and equipped with contact switches such that actuation of said joy stick in a predetermined direction controls operation of at least one of said valves, said hydraulic motors, said engine, said transmission pump and said flow divider to control movement of said vehicle.

8. The all-terrain vehicle of claim 6, which includes a communications unit operably connected to said central control processor.

9. The all-terrain vehicle of claim 6, which includes a firefighting equipment unit connected to one of said first and second chassis and wherein said firefighting equipment unit is operably connected to said central control processor.

10. The all-terrain vehicle of claim 6, which includes a microwave impulse equipment unit connected to one of said first and second chassis and wherein said microwave impulse equipment unit is operably connected to said central control processor.

11. The all-terrain vehicle of claim 6, which includes a water cannon unit connected to one of said first and second chassis and wherein said water cannon unit is operably connected to said central control processor.

12. The all-terrain vehicle of claim 6, which includes a surveillance unit connected to one of said first and second chassis and wherein said surveillance unit is operably connected to said central control processor.

13. The all-terrain vehicle of claim 6, which includes a surveillance unit connected to one of said first and second chassis and wherein said imaging equipment unit is operably connected to said central control processor.

14. The all-terrain vehicle of claim 6, which includes a field sensor unit including one of multi-function Rf, UAV, Tri-Band Radar, Active Protection Radar, and unattended sensor network in Ku, Ka and W-Band connected to one of said first and second chassis and wherein said field sensor unit is operably connected to said central control processor.

15. The all-terrain vehicle of claim 1, wherein said plurality of wheels includes more than four wheels each powered by the respective hydraulic motor.

16. The all-terrain vehicle of claim 1, which includes a weapons unit connected to one of said first and second chassis.

17. The all-terrain vehicle of claim 1, which includes a communications unit connected to one of said first and second chassis.

18. The all-terrain vehicle of claim 1, which includes a firefighting equipment unit connected to one of said first and second chassis.

19. The all-terrain vehicle of claim 1, which includes a microwave impulse equipment unit connected to one of said first and second chassis.

20. The all-terrain vehicle of claim 1, which includes a water cannon unit connected to one of said first and second chassis.

21. The all-terrain vehicle of claim 1, which includes a surveillance unit connected to one of said first and second chassis.

22. The all-terrain vehicle of claim 1, which includes an imaging unit equipment connected to one of said first and second chassis.

23. The all-terrain vehicle of claim 1, which includes a field sensor unit including one of multi-function Rf, UAV, Tri-Band Radar, Active Protection Radar, and unattended sensor network in Ku, Ka and W-Band connected to one of said first and second chassis.

24. The all-terrain vehicle of claim 1, which is further characterized to include a hull having and upper body and a lower body wherein each said body includes sides with an incline slope from between about 1 degree to 95 degrees and wherein said hull is characterized from bottom to top with said lower body transitioning from narrow to wide and said upper body transitioning from wide to narrow.

25. An all-terrain vehicle, which includes:
a first chassis and a second chassis hingedly connected to said first chassis to permit vertical oscillation between said first chassis and second chassis by way of a first set of side plate surfaces on a rear of said first chassis having an opening therein and a second pair of side plate surfaces on a front end of said second chassis having an opening therein, and wherein said openings are coaxially aligned to receive a bearing shaft therein and hingedly connect said chassis, each of said first and second chassis including a plurality of wheels which are each operably connected to a respective hydraulic motor;
said hydraulic motors operably connected to an engine which is operably connected to said first chassis;
a transmission pump operably interconnects said hydraulic motors and said engine; and
a flow divider operably interconnects said transmission pump and said hydraulic motor to regulate hydraulic flow to said hydraulic motor, wherein said hydraulic motor, said flow divider, said transmission pump, and said engine are operably interconnected and hydraulic lines interconnect said hydraulic motor and said flow divider;
valves connected to said hydraulic lines and a processor operably connected to said hydraulic lines to detect a pressure differential change in said hydraulic lines and actuate said valves in response to said pressure differential change.

26. An all-terrain vehicle, which includes:
a first chassis and a second chassis hingedly connected to said first chassis, each of said first and second chassis including a plurality of wheels which are each operably connected to a respective hydraulic motor, wherein each of said hydraulic motors are operably connected to an engine which is operably connected to said first chassis;
a transmission pump which operably interconnects said hydraulic motor and said engine;
a flow divider operably interconnects said transmission pump and said hydraulic motors to regulate hydraulic flow to said hydraulic motors, wherein each of said hydraulic motors, said flow divider, and said transmission pump are operably interconnected via hydraulic lines;
valves connected to said hydraulic lines; and
a processor operably connected to said hydraulic lines to detect a pressure differential change in said hydraulic lines and actuate said valves in response to said pressure differential change.

* * * * *